June 27, 1939.　　C. DE GANAHL ET AL　　2,163,590
METHOD AND APPARATUS FOR WELDING CORRUGATED SHEETS TO FLAT SHEETS
Filed Sept. 9, 1937　　4 Sheets-Sheet 2
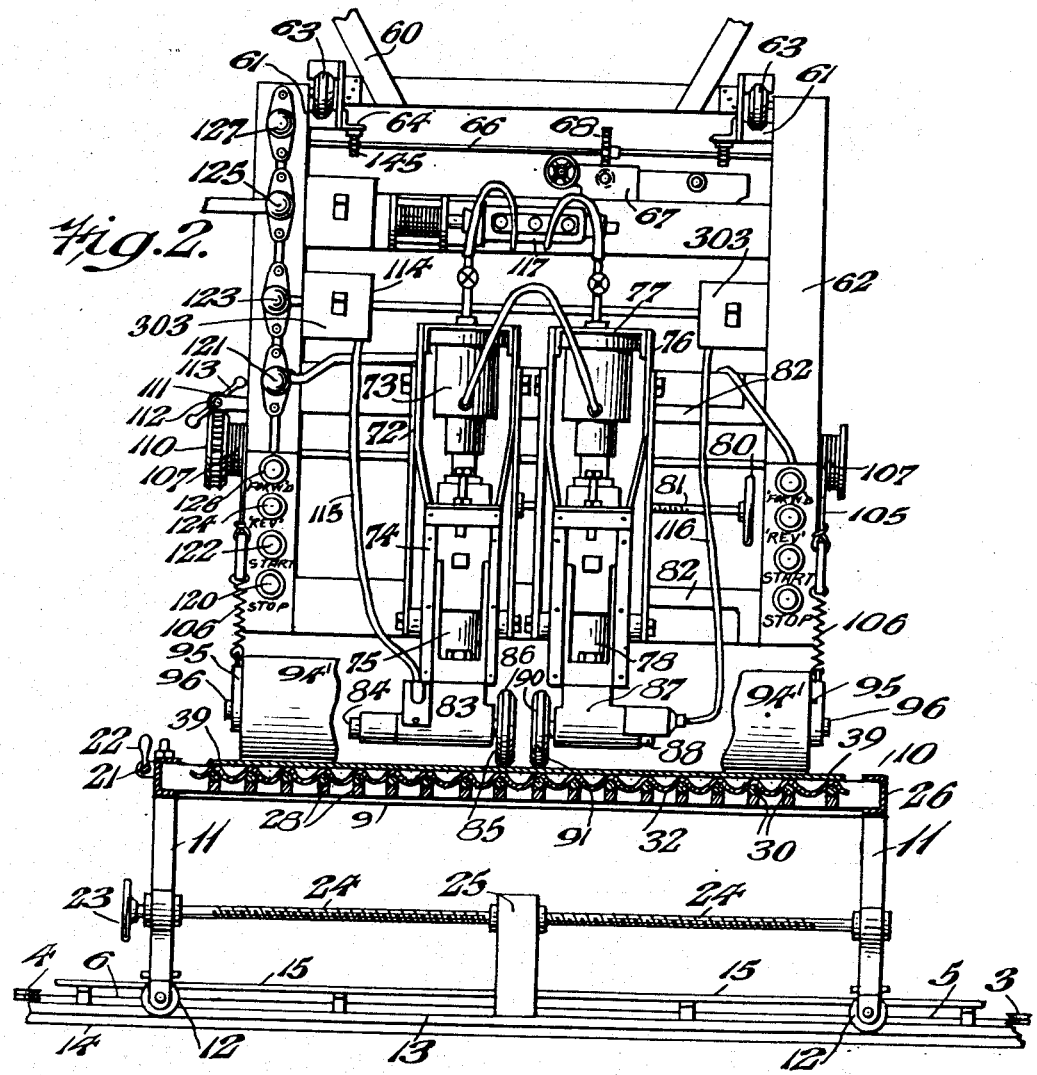
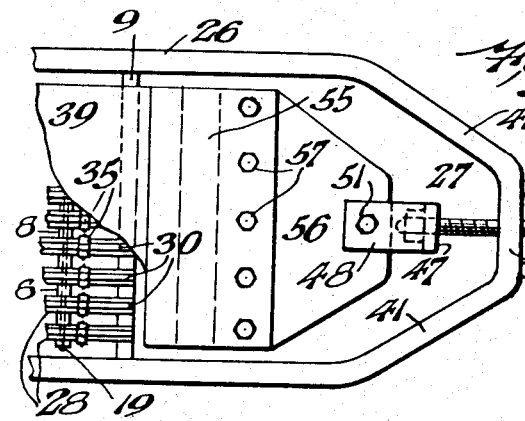
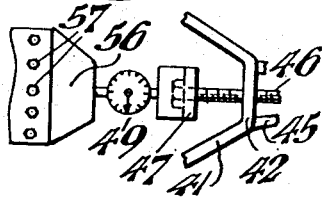
INVENTORS:
THOMAS B. LAVELLE.
CARL DE GANAHL.
BY
Frank H. Borden
ATTORNEY

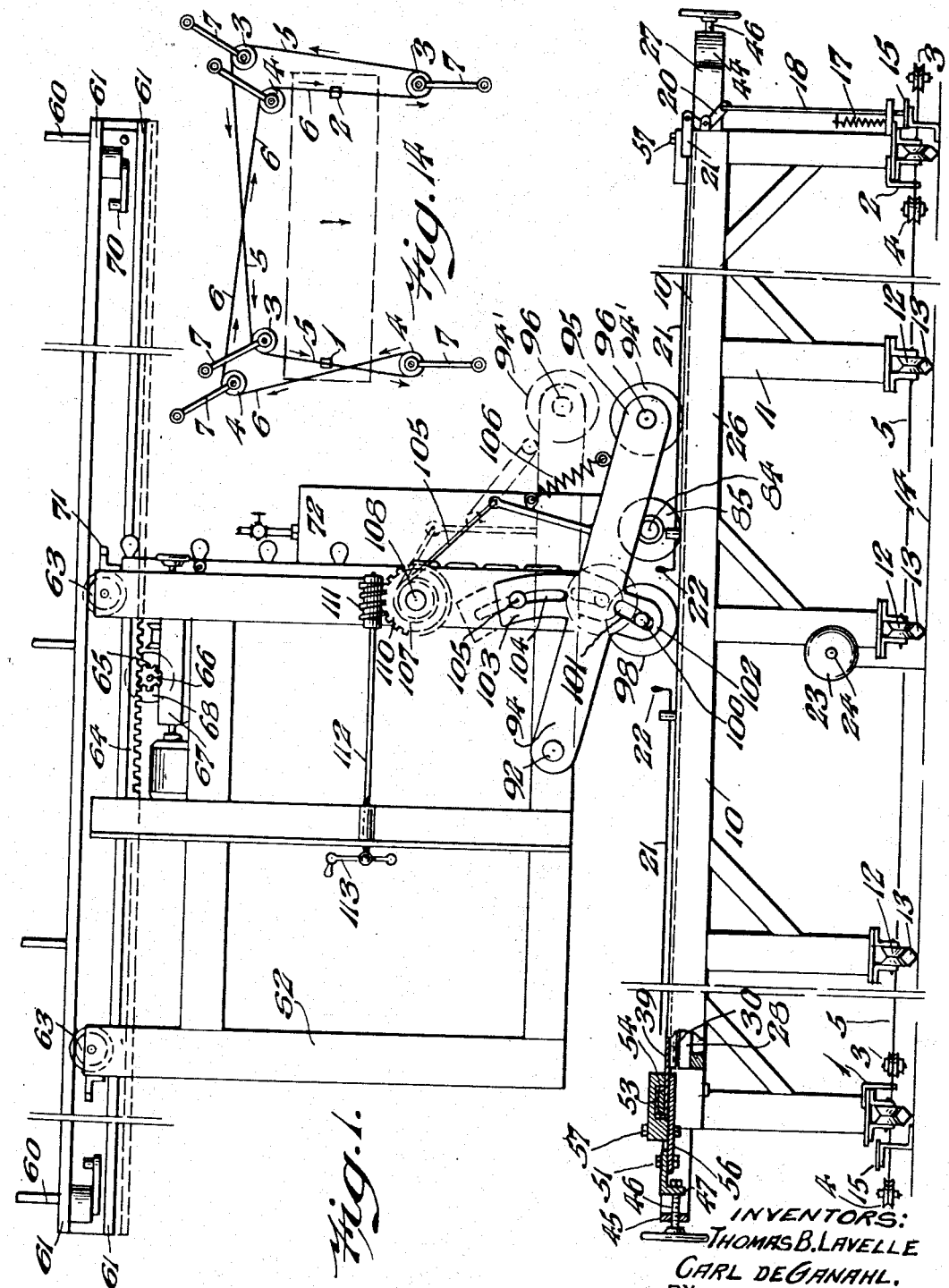

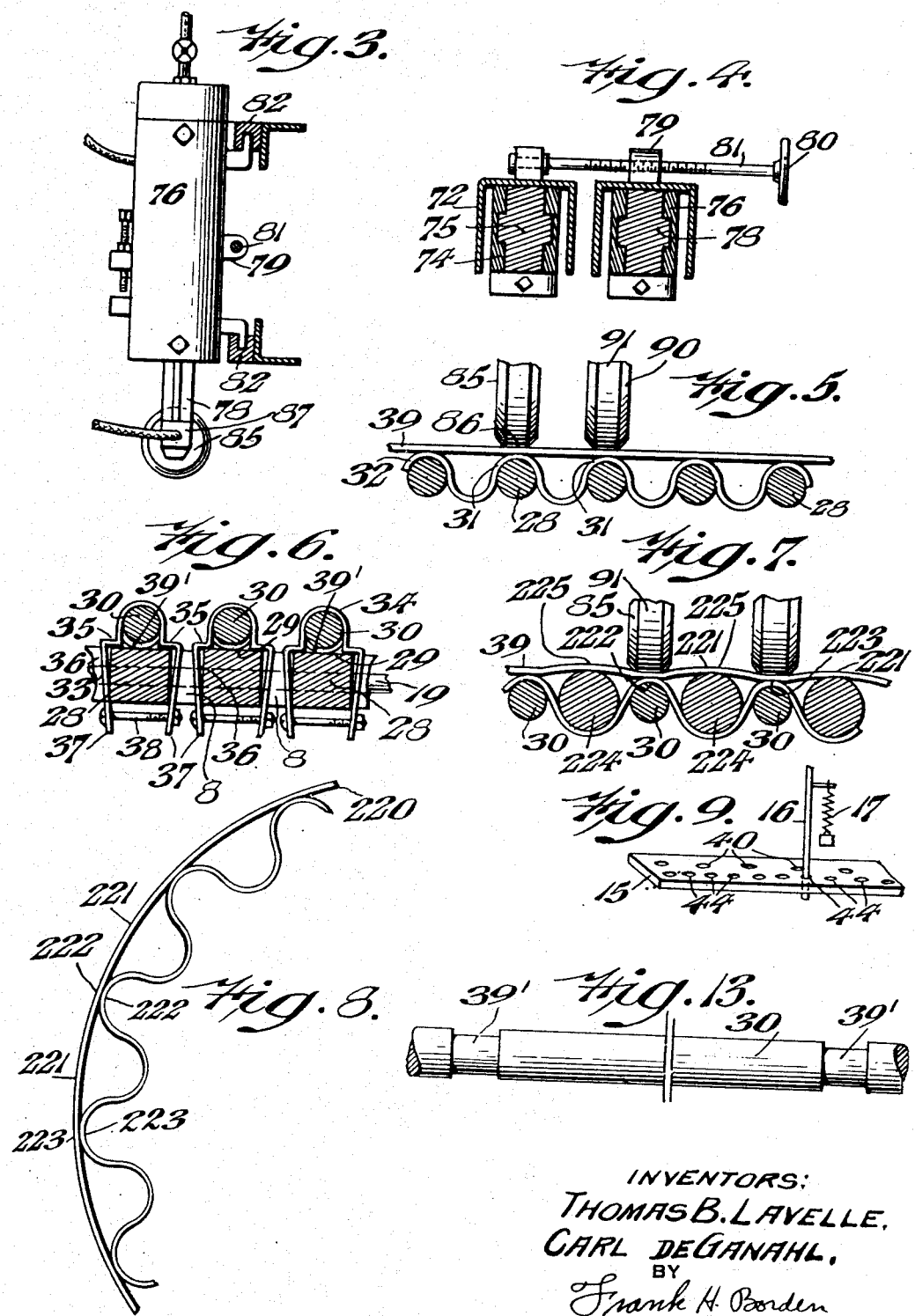

June 27, 1939. C. DE GANAHL ET AL 2,163,590
METHOD AND APPARATUS FOR WELDING CORRUGATED SHEETS TO FLAT SHEETS
Filed Sept. 9, 1937 4 Sheets-Sheet 4
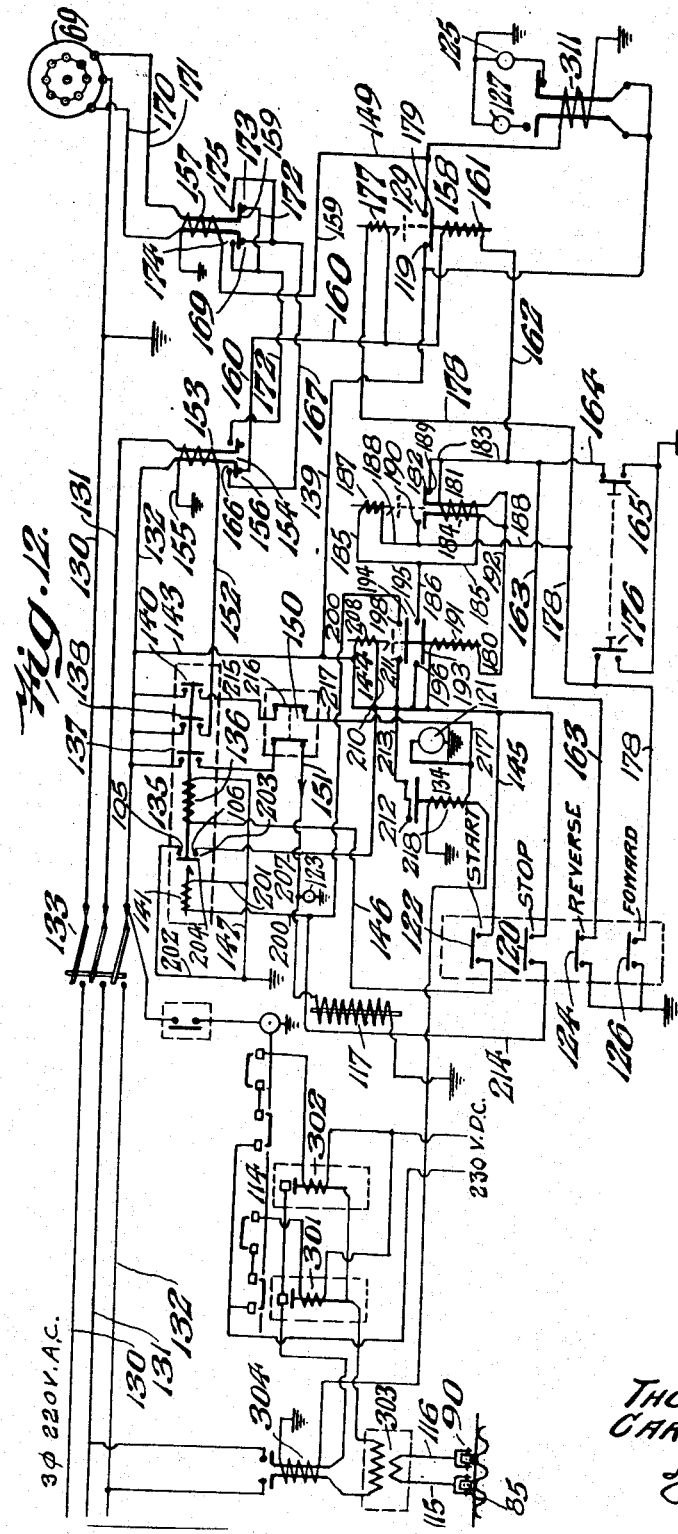
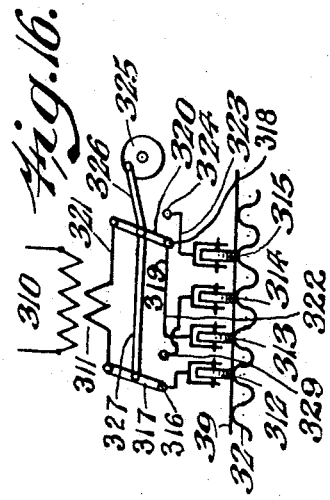
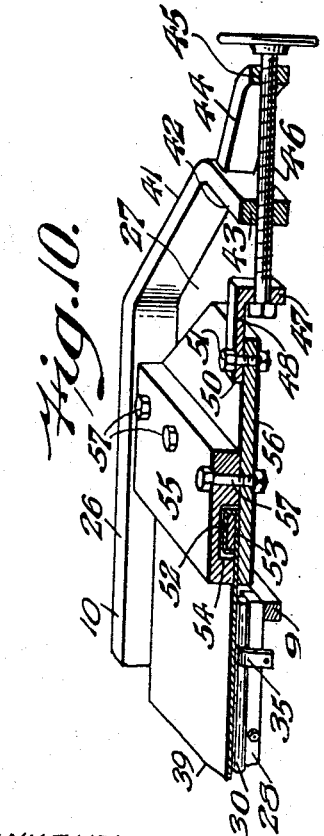
INVENTORS:
THOMAS B. LAVELLE,
CARL DE GANAHL.
BY
Frank H. Borden
ATTORNEY Patented June 27, 1939

2,163,590

UNITED STATES PATENT OFFICE 2,163,590

METHOD AND APPARATUS FOR WELDING CORRUGATED SHEETS TO FLAT SHEETS

Carl de Ganahl, Bristol, and Thomas B. Lavelle, Langhorne, Pa., assignors to Fleetwings, Inc., Bristol, Pa., a corporation of Delaware Application September 9, 1937, Serial No. 163,018

40 Claims. (Cl. 219—4)

This invention relates to methods and apparatus for welding corrugated sheets to flat sheets.

In aircraft there are many situations where a composite sheet composed of flat and corrugated sheets can be used to excellent advantage. Sheets of hard resilient stainless steel, aluminum "Alclad" and the like, for instance, are particularly advantageous in modern aircraft with corrugated sheets comprised of arcuate corrugations, preferably of continuously curved surfaces, as the reinforcement for the planar sheets. In assembling such composite assemblies in the past it has been usual to dispose the flat sheet upon a support, to dispose the corrugated sheet in superimposed relation thereon, then to associate the two together by a series of spot welds, either spaced or overlapping in a seam, by roller electrodes respectively resting and running in the corrugation and engaging the flat sheet. Among other disadvantages attaching to this procedure was the propensity for the weld to take place off from the peak or apex of the corrugation, instead of in the stabilized symmetrical location exactly on the peak. The weakness and uncertainty of this procedure will be obvious.

It is among the objects of the invention; to provide a welding machine in which corrugated and plane sheets can be rigidly welded together with uniform strength and with great speed; to provide a method of associating flat and corrugated metallic sheets rigidly together; to improve welding machines; to provide a control system of interlocking electrical instrumentalities for welding machines; to provide a welding apparatus with means for applying welding force to the electrode, means for causing relative motion between the work and welding electrode, with means controlling the flow of the welding current, with a controlling system so arranged that the flow of the welding current cannot occur until electrode force and relative motion have been secured, and so arranged that the electrode force cannot be removed nor relative motion stopped until after the welding current flow has been interrupted; to provide a welding apparatus in which successively welding pressure is applied, relative motion between electrode and work is secured, welding current flow is initiated, and in which the interruption in welding is secured in reversely successive order; to provide a welding apparatus in which electrode pressure, relative motion between work and electrode and flow of welding current are controlled by a single manual agency; to provide in welding apparatus means for automatically reversing the direction of relative motion of the work and an electrode, when a limit has been reached; to provide means and a method for welding relatively corrugated and uncorrugated sheets together so as to crowd extra metal in the uncorrugated sheet between corrugation peaks, whereby bending of the composite sheet enables the uncorrugated sheet to be substantially continuously curved; to provide a continuously curved composite sheet; and many other objects and advantages as will become more apparent as the description proceeds.

In the accompanying drawings, forming part of this description;

Fig. 1 represents a side elevation of the welding machine of this invention according to the preferred embodiment thereof, Fig. 2 represents a front elevation, partially in section, of the welding machine of Fig. 1, Fig. 3 represents an elevation, partially in section, of a fluid motor for vertically supporting and moving an electrode roller arranged for lateral movements as well, Fig. 4 represents a fragmentary horizontal section through the fluid motor supports for both electrode rollers, showing the lateral adjusting screw for one of the supports, Fig. 5 represents a fragmentary vertical section, partially in elevation, through an assembly of roller electrodes, flat and corrugated sheets, and supporting rods engaging in the corrugations, Fig. 6 represents a fragmentary section through the supporting plates and rods of the table, showing the anchor permitting slight lateral shifting of the rod electrodes, Fig. 7 represents a view similar to that of Fig. 5, with the addition of flat sheet distorting or crowding rods so arranged that the material between peaks of the electrodes is greater than the normal flat distribution, Fig. 8 represents a fragmentary elevation of the finished compound sheet of Fig. 7, bent into a continuously curved section, Fig. 9 represents a fragmentary perspective of a guide plate for the table to align the rods of the table with the roller electrodes, Figs. 10 and 11, represent, respectively, a fragmentary plan and elevation, partially in section, of the end of the table, showing the tensioning means for the flat sheet, Fig. 12 represents a wiring diagram for the machine assembly, Fig. 13 represents a fragmentary elevation of an individual rod of the grid of rods, showing the peripheral recesses to receive the attaching clamps to maintain the unbroken cylindrical extent of the assembly, Fig. 14 represents a diagrammatic plan of the table and its "follow-up" cable system to insure simultaneous motion of both ends of the table, Fig. 15 represents a fragmentary diagrammatic plan of the tensioning device for the metal sheet, showing a tension scale system to enable predetermination thereof, and Fig. 16 represents a diagram of a modified form of device incorporating selectively pairs of a multiplicity of rolling electrodes.

The machine comprises an elongated table 10, mounted on a plurality of supports or legs 11, each terminating in a roller 12, resting and movable on stationary tracks 13 extending transversely of the machine and resting on the floor 14. The table is held in a predetermined position relative to rails or tracks 13 by means such as the transverse apertured plates 15 (at each end) each having preferably two or more sets or rows of aligned apertures 40 spaced on centers coinciding with the pitch of the corrugations being treated. A pin 16 is vertically disposed and pressed by spring 17 into a given notch or aperture in plate 15. Pin 16 is controlled by a link 18, bell crank 20, and horizontal link 21, actuated by a handle 22 toward the center of the table. Preferably there is a registration plate and pin at each end of the table, as noted, and handles 22 are close to the table center for operation simultaneously with the transverse adjusting means shown in Fig. 2. This comprises preferably a hand wheel 23 rigid with rotatable threaded shaft or screw 24, journalled in opposite legs 11, for rotation without axial movement relative to the table. The screw 24 passes through a fixed nut 25 mounted on the floor 14. The whole provides lateral shifting of the entire table to bring the work successively in steps under the welding roller to be described.

In view of the great length of the table and of the mass of metal which it carries, it is necessary that the remote or extreme ends of the table be caused to move in synchronism. A preferred and simple device for this purpose is shown in Fig. 14. The table 10 has an attached stop 1 toward one end and another stop 2 toward the other end, both close to the floor 14 and preferably in the center.

A cable 5 extends from one side of stop 1, say the front, about pulleys 3, and terminates at the rear side of stop 2. A second cable 6, which may either be independent or a continuation of the first mentioned cable 5 extends in the opposite direction from the other, or rear, side of stop 1, about pulleys 4, to the other, or front, side of stop 2. The system of pulleys and cables is kept taut by suitable means such as by turnbuckles (not shown), or by the flexible hangers or stays 7, or the like, connected to the floor 14. Movement of one end of the table as, for instance, the end carrying stop 1, is automatically accompanied by an identical movement of the other end of the table, carrying stop 2, because of the tension on and direction of movement of the cables, as will be clear.

The table 10 has suitable longitudinal frame members 26, such as angle or channel units, which extend the full length of the table and at each end bend toward each other and toward the center in a V formation, as at 27. The table is provided with suitable transverse bracing and frame members 9 to form a rigid entity. A grid of electrically coupled plates or bars and rods is provided for removable and replaceable association with the table 10, predetermined as to size and spacing by the pitch of the particular corrugated sheets forming with the flat sheets the work to be welded. Thus a plurality of narrow elongated supporting plates or bars 28 are held in parallel spaced relation and in intimate electrical association by spacing sleeves 8 surrounding a transversely extending bolt or tie rod 19 extending through the bars and clamping them all together in a rigid grid arranged for seating on the table 10 substantially in a horizontal plane. As will be later explained the grid of rods could be arcuate in cross section, in place of planar, if pre-curved assemblies were desired. In this case the rolling electrodes to be described will have radial movement relative to such grid, rather than perpendicular as shown. Plates or bars 28 have a flat upper face 29, and may be made of any desired material of high or low resistance as desired, although copper is preferred.

Extending longitudinally on top of plates 28 is the plurality of round low-resistance rods 30, preferably of copper, having such diameter as to substantially fit within the downward presented open corrugations 31 of a selected predeterminedly corrugated sheet 32. Each rod 30 is clamped more or less loosely to the appropriate or registering supporting plate or bar 28, so as to be capable of restrained but free lateral shifting within limits. This is accomplished, illustratively, by spring clamps 33, or the like, having a median semi-cylindrical portion 34 arranged to fit tightly and closely in a peripheral recess 39' in rod 30, to hold it against the upper plane surface 29 of the plate. The clamp or clip has shoulders 35 slidable on the upper plate surface by reason of the lateral clearance 36 afforded toward the top of the plate by the clamp 33. The lower part of the clamp comprises legs 37 extending below the plate and joined by the transverse bolt 38. The clamps are of conducting material such as copper so as to insure maintenance of electrical coupling between all of the bars and rods of the grid.

The arrangement is such that slight inequalities of frictional resistances that might cause such binding or misalignment as to prevent the seating of a corrugated sheet upon rigid and immovable rods, are obviated or nullified by the elasticity, so to speak, of the individual rods of the grid of rods, each of which is capable of slight lateral shifting, as shown. Preferably as noted the rods 30 are electrically connected together, although obviously if desired the rods may be relatively insulated from each other, or arranged in groups of electrically connected rods, insulated from adjacent groups. It will be understood that a given aperture 40 in plate 15 corresponds to a given position of the mean center line or axis of a rod 30 in a predetermined selected grid. It will be understood that a suitably corrugated sheet or sheets 32 will first be superimposed upon the grids, then the flat sheets 39 will be applied thereover prior to welding. However the supposedly flat sheets of stainless steel, for instance, if used, are delivered in rolled form and must first be unrolled before use. It is found that certain bumps and curves remain in the flat sheets which are prejudicial to satisfactory welded work. Therefore the stretching device shown in Fig. 10, or its equivalent, is resorted to as the next procedural step in the use of the apparatus. The end 27 of table 10, at each end, although but one will be described, having the tapering frame members 41, continuations of the side frame members 26, has a transverse end plate 42 having a central hole 43. Upon plate 42, a screw jack 44, or the like, is mounted, comprising the stationary internally threaded nut 45, in which the threaded shank 46 is rotatable. The shaft 46 extends through opening 43 and has a loose coupling connection 47 and a short extension 48 terminating in coupling end 50 arranged to receive a coupling pin 51. A more or less elongated sheet of steel 39 has its end 52 bent about a cross strip 53 forming a terminal enlargement, which is disposed in a recess 54 of a clamp jaw element 55, extending substantially the full width of the sheet 39. A main jaw clamp element 56 has a flat surface to engage the sheet 39 on its opposite surface from that engaged by jaw 55. The main element is removably coupled by pin 51 to the extension 48 and to the axially movable tensioning device 46, and is removably engaged with clamp member 55 by a plurality of bolts 57. It will be understood that the opposite end of sheet 39 will be similarly clamped, either to anchor the sheet or to furnish a tension from both ends at once if desired. The tensioning arrangement is such that a pull is delivered to sheet 39 substantially in the plane of the upper surfaces of the grid of rods, and suffices to pull the sheet into a condition of substantial planarity, wherein all normally retained hollows and twists and humps are pulled flat, without, however, placing such tension on the sheet as would establish a stressed condition during welding.

As the degree of tension is important, it may be desirable, as shown in Fig. 15, to introduce into the tension line, a scale or spring balance 49, so that a predetermined tension can be given to the work. The advantages of this will be obvious, especially when the dangers incident to variations in tension between similar parts are appreciated.

The welding electrode carriage of the apparatus is preferably suspended from an overhead frame 60 in fixed relation to the floor 14 and includes track members 61 extending substantially parallel to the rods in the table below. The carriage comprises a substantially rectangular open frame 62, having suitable cross members as desired, having upper supporting rollers 63. A rack 64 is mounted rigidly horizontally adjacent each track 61 in mesh with gears 65 mounted on a shaft 66 driven by a suitable variable speed mechanism, such for instance as a "Reeves drive" 67 through drive gear 68. The arrangement is such that the entire carriage 62 can be positively driven forwardly or in reverse for the full length of the table, or of the desired portions thereof, or of the supporting track. In this connection it will be clear that suitable limit switches will be adjustably positioned to be engaged by portions of the traveling carriage. Thus a limit switch member 70 controlling a switch 165 or 176 is adjustable on track 61 to be engaged and tripped by a stop 71 on the carriage at each end of the track.

On one face of the traveling carriage there is rigidly mounted a vertical frame 72 carrying a fixed pneumatic cylinder 73 and forming a vertical guide 74 for the vertically reciprocable plunger 75 controlled by a piston in cylinder 73. A second vertical frame 76, carrying cylinder 77 and plunger 78, is mounted on the frame or carriage for lateral adjustment, by any suitable means such as hand wheel 80 and screw 81 engaging a nut 79 on the rear of frame 76. The second frame 76 is held against vertical movement while slidable laterally, transversely of the table 10, on guide rail supports 82. Thus the frames can be relatively laterally adjusted to vary their spacing to accord with the pitch of the corrugations, and to the size and spacings of the rods of the grids, which are changed according to corrugation pitch changes. Practically and preferably there are at least four different corrugation pitches used, and each will be accomplished by replacement of the entire grid of bars and rods for the selected pitch.

At the lower end of plunger 75, and in insulated relation thereto, is adjustably mounted the roller electrode journal block 83 in which a shaft 84 is freely rotatable, with its axis transverse of and substantially perpendicular to table 10 and rods 30 and the corrugations of a sheet mounted thereon. Shaft 84 carries the electrode roller 85 having a narrow peripheral contact area 86. Plunger 78 carries insulatedly the journal block 87 in which shaft 88 is rotatable and which carries roller electrode 90, having the narrow peripheral contact area 91. The rollers 85 and 90 are preferably concentric and parallel and are so disposed that the respective narrow peripheral contact band of each is symmetrically above the apex of adjacent corrugations on the grid of rods 30. Suitable adjustments will be provided and it will be understood that cylinders 73 and 77 will be so actuated, as by pneumatic pressure, as either to raise or positively and firmly to lower the respective rollers 85 and 90 to circuit closing engagement with sheet 39 superimposed upon corrugated sheet 32.

In addition to the surface irregularities of the supposedly flat sheet that might become impressed in some manner on the finished work if it were not placed under a preliminary tension, as previously described, it is found that welding such seams as are here contemplated, in the usual course, frequently results in distortions of various kinds, such as twists, undesired sheet convexities, and the like, where the roller electrodes are the principal means for forcing the sheets into intimate contacting relation. To insure an absence of such undesired distortions, heavy rollers of appreciable length and diameter are provided and arranged to float to their desired level in compressing association with the upper planar sheet. To this end, on each lateral side of the traveling carriage, there is pivoted at 92 an arm 94, having at its extreme end a journal 95 for a shaft 96 carrying a primary weighted roller 94', as of solid metal, free to float up and down in accordance with its reaction from the assembled work passing under it. Flattening roller 94' is disposed on the advancing or "forward" side of the electrode rollers 85 and 90, although preferably not too far away from the electrodes. A secondary rearward weighted roller 98 is supported on a shaft 100 extending through a slot 101 in a bracket 102 mounted on arm 94, behind or on the other side of the electrode rollers 85 and 90 from roller 94'. It will be clear that secondary roller 98 may float in the slots 101 independently of the fluctuations of arm 94 responsive to movements of the roller 94'. Arm 94 has a guide bracket 103 slotted at 104 about a pin 105. The slot 104 forms limits to the upward and downward adjustments of the rollers by movements of arms 94. Such predetermined adjustments or movements of arm 94 are secured in any desired manner, as by cables 105 connected by spring 106 to arm 94 and passing about drums 107 at each side of the carriage on a shaft 108 actuated by a worm wheel 110 actuated by a worm 111 on shaft 112 driven by handle 113.

It being appreciated that after the sheets are superimposed and mounted on the table 10, the crank is turned and the weights disposed in floating rest on the work on each side of the electrodes and thus comprise rolling clamps. Owing to the wide expanse of metal pushed toward the plane of the table top (grid level), the welding taking place, as hereinafter explained, is in completely flattened untwisted sheet metal, so that the resultant product is a planar sheet to which a corrugated sheet is affixed.

The rolling clamp is primarily designed to maintain the position of component parts of the work remote from the welding, relative to the components of the work being welded during the welding operation. Thus the parts remote (disposed longitudinally between the rollers laterally for their full length) are held flat against the grid, during the welding of the work under the rolling electrodes, and the resulting finished work is therefor unwarped and is completely flat. Obviously a change in the contour of the grid of rods, and of the rollers of the rolling clamp, say to an arcuate form (not shown) secures the same result exactly, and the finished work has a uniform, unwarped, non-distorted, arcuate formation after passing under such rolling clamp. In this latter case, with arcuate or curvilinear work the conforming rollers due to different diameters of different parts of the rollers might have slipping relation with portions of the work, but this will make no particular difference.

As noted also the fluid operated pistons would in this latter case have a path of movement that was substantially radial of the grid, in place of the disclosed vertical movement.

The traveling carriage carries everything necessary to complete welding, except a source of electric power, which is lead to it by suitable connectors from an extraneous source. A welding timer 114 and welding transformer 303 of suitable construction are mounted on the carriage and include leads 115 leading to block 83 and electrode roller 85, and connector 116 leading from roller electrode 90 and block 87 to the timer. The arrangement is preferably such as to produce automatic continuous series of spaced welding impulses in rapid succession, adjustable, for instance, to furnish welds at the rate of say 2, 4 or 8 welds per second as desired, as will be obvious to those skilled in the art. It will be obvious that with such series in relatively fixed timed relation the spacing of welds in the work will depend upon the speed of relative motion of the work and the electrodes. Thus by simply varying the speed of the drive for the traveling carriage, as noted, the weld lines will be comprised either of spaced independent welds or of overlapping welds forming a seam. The speed of travel of the carriage varies, illustratively, between 4.5 and .27 feet per minute, although other speeds can be secured if desired.

In order to secure a given or desired quasi-automatic action of the plungers for the roller electrodes, a solenoid-operated valve 117 is provided having suitable connections, so that when energized in one way it delivers compressed air or steam to both cylinders 73 and 77 at once to force the rollers 85 and 90 firmly against the work. When oppositely actuated it causes compressed fluid to enter the opposite ends of the cylinders to raise both plungers and rollers. Suitable valves and the like (not shown) are provided as to enable independent operation of one roller electrode at a time if desired.

To facilitate the operation of the mechanism a series of electrical instrumentalities are provided, as follows: On the front of the carriage at points convenient to the operator there are a series of push button switches or circuit closures. At the bottom, preferably, for easy and quick location and operation, there is a "stop" button or other switch element 120. Above stop switch 120, are the "start" switch 122, "reverse" switch 124, and "forward" switch 126.

At any desired location on the traveling crane or carriage it is preferred to place a series of visual indicators, such as electric lights, possibly of various colors, to impart predetermined information. Thus lamps 121, 123, 125 and 127 may indicate that any given switch has been closed, or that an intermediate relay has a given position relative to its controlled circuit, etc. While the respective lamps may indicate the actuation of some or all of the respective named switches, it is preferred that one lamp, such as 121, illustratively, indicate that the welding current is on or off, according to its indication, lamp 123 indicates that the device is ready to weld, while lamps 125 and 127 respectively indicate "forward" and "reverse" travel of the carriage according to the closing of the manual switches or the limit switches previously discussed.

For convenience the switches are provided in duplicate on each side of the carriage, although preferably only a single set of signal devices is used. Obviously the signal device may be omitted, may be in duplicate, or may be arranged to designate different electrical situations than those recited, and may be of any nature such as of different colors as noted, or may be audible instead of, or in addition to, visual.

It is preferred that certain switches have dual functions. Thus switch 122, the starting switch, is arranged to be actuated three successive times to secure the proper coordinated orderly sequence of operations necessary to start the device welding.

Referring to the diagram it will be understood that 220 V. three phase alternating current is provided by leads 130, 131 and 132, controlled by a master switch 133. A spot-welding timing device of conventional nature is indicated at 114, connected to leads 131 or 132, to line 130 through common connections, either directly or through switch 304 (hereinafter described).

This timer by means of contactors 301, 302 permits a given timed current to pass through the welding transformer 303 at regular intervals depending on the number of contactors and the speed of the motor drive, which is preferably at the rate of either 2 or 4 impulses per minute, although other speeds are easily available and are contemplated. The welding current flows through roller electrodes 85 and 90 only when main welding contactor 304 is closed.

A three position sequential relay 135 has an operating coil 136 arranged to actuate switch 204 each time it is actuated and arranged to successively close secondary switches 137, 138 and 140 and to hold them closed until releasing coil 141 is actuated and successively opens the circuits beginning with switch 140, then 138 and finally 137. The three way solenoid coil 136 is in circuit with starting switch 122, by connectors 143, 144, 145 and 146, coil 136, connector 147, to ground. The secondary switches or circuit controllers of the solenoid effect the working of certain elements as follows: Switch 137, actuated on the first push of the starting button closes a circuit from lead 132, through a control switch 150, through the solenoid air valve 117 and to lead 130 through ground thus forcing the roller electrodes down against the work; the second operated switch 138 has a connection 152 to a coil 153 of a relay 154, controlling the crane drive motor 69 and closing a circuit therethrough when coil 153 is energized and the cross-bar 166 is raised from "back" contact 156, the other end of which coil is connected to line 130 as at 155. Relay 154 has a common back contact 156 which is only engaged when cross-bar 166 is dropped by opening of the circuit through coil 153 and is thus arranged to prevent operation of the crane motor reversing relays 157 and 158 until after the crane motor has been disconnected from the line.

The motor reversing relay circuits include connector 160 from the contact 156 to coil 161 of relay 158, then through connection 162 and 163 through manual "reverse" switch 124, to line 130, or through lead 164, through automatic limit switch 165 to line 130. Actuation of relay 153 by the switch 138 raises cross-bar 166 of the relay from contact 156 and closes a circuit from lead 132, through the relay 153, through 167, contact 169 or 175, depending upon the actuated position of cross-bar 159 of the relay, relay 157, connector 170 or 171, to the crane motor 69, or through connector 171 or 170, through relay 157, contact 173 or 174, connector 172, relay 153, to lead 131. If "reverse" operation of the crane or traveling carriage is desired, the relay 157 is actuated to raise the cross-bar from contacts 169 and 173, and into engagement with contacts 174 and 175, respectively, the lines 172 and 167. For "forward" running the contact bar 159 is dropped and the circuit is reversed as will be clear. The actuation of relay 157 to drop bar 159 is accomplished either by actuation of manual switch 126, or of automatic limit switch 176. In this case the circuit is from lead 132, relay 153, contact 156, connector 160, releasing coil 177 of relay 158 (opening its switch by dropping its cross-bar 179), then through connector 178, either through switch 176 or 126 to common line 130. The dropping of cross-bar 179 opens the circuits 143, 139, contact 119, bar 179, contact 129, coil of 157. This drops bar 159 into the lower position.

It will be clear that actuation of either reverse or forward manual switch, or the appropriate automatic limit switches will actuate relay 158 in one direction or the other, which in turn actuates relay 157 to reverse the carriage motor circuits from what they had been at the instant the particular switch was closed. It will be understood that the reversing of the current to the carriage or crane motor should stop the motor, and that, except for manual stoppages, a predetermined reverse or forward motion of the carriage should be initiated by the closing of one limit switch at one end of the carriage track and maintained until the opposite limit switch is actuated at the completion of the carriage travel. To this end relays 180 and 181 are provided, of which the latter has a contact bar 182, which in the released position shown is in contact with contact 189 in circuit with coil 161 of relay 158 by means of the connectors 162 and 163. The coil 184 of relay 181 is in circuit with connector 183 at one end and at the other by connector 185 is connected to relay releasing coil 187 of the relay 181. Coil 187 is in circuit with connector 178 of the "forward" switch circuit already described, by connector 188 and the latter also contains a contact 190 in position to be engaged by the contact bar 182 of relay 181 when the relay coil 184 is actuated to raise the contact bar. The contact bar 182 of relay 181 is in circuit with coil 191 of relay 180, by connector 192. Relay 180 has two contact bars, respectively 193 and 194 so as to simultaneously close, or open, two distinct circuits, as follows: Contact arm or bar 193 engages a contact 195, connected by wire 186 to connector 185 of the coils of relay 181, and contact 196, joined to connector 144 joined by connector 143 to lead 132, at one end, and leading to wire 145 and "start" switch 122, and operating coil 136 of the three position relay 135 through wire 141 to line 130 at the other, and contact bar 194 engages a contact 198 joined by wire 200 to "release" coil 141 of the three position sequential relay 135, then through wire 201 and 147 to line 130, or through wire 202, to one side of release or neutral switch 203, the cross-bar or contact 204 of which moves to circuit closing position engaging contacts 105 and 106 whenever "operate" coil 136 is energized, and the respective secondary circuit controllers 137, 138 and 140 in that order are closed, and from "release" contact 106, by wire 207 to the "release" coil 208 of relay 180, by wire 144, to wire 143. Additional connectors and contacts are provided, as follows; to contact 212 of relay 134, by wire 213 from connector 144. From connector 144 through "stop" switch 120, by wires 214, 200, to release coil 141 of the relay 135. The cross-bar 179 of relay 158 is moved into latched engagement with contacts 119 and 120 to close a circuit from lead 132, wires 143 and 139, cross-bar 179, wires 149, through signal relay 311 to line 130, and through coil of relay 157 to line 130. The relay thus is energized to reverse the circuits through the crane or carriage motor. When relay 311 is energized lamp 127 gives reverse indication; when relay 311 is deenergized lamp 125 gives forward indication.

It will be agreed that there will be numerous occasions whereupon it will be desirable to move the carriage relative to the work, or its supporting table without actually welding, and that means to "cut out" the welding would be valuable. To this end the circuit from lead 132, through the last operated switch 140 of the three circuit relay 135, is by a wire 215, through a toggle or other manually operated switch 216, through wire 217, coil 218 of relay 134 to ground. Obviously, when the toggle switch 216 is closed, the welding is automatically initiated upon the third push being applied to the "start" button 122.

It is thought that with the discussion just preceding, the operation of the system and the functions of the purely diagrammatic disclosure will be clear. In brief, the diagram purports to indicate a situation in which the direction of travel is to be "forward". Instantaneously limit switch 176 is held closed by the carriage which has actuated it and releasing coil 177 has dropped opening reversing relay 158. The timer motor is connected as shown on the drawings. After the air valves have been started by the first push on "start" button, closing switch 137 of relay 135 and forcing the welding rollers against the work, the next successive push closes switch 138, operating coil 153, raising cross-bar 166, closing circuit through the leads of relay 157, through leads 170 and 171 to the crane or carriage motor, starting the crane on its forward drive. Thereafter the button 122 can be given its third push, switch 140 of relay 135 is closed and the welding operation begins. The operation continues until either the stop switch 120, reverse switch 124, or limit switch 165 is actuated.

If the "stop" button is pushed a circuit is closed from lead 132, wires 143, 144, switch 120, wires 214, 200, release coil 141 of relay 135, wires 201, 147, to ground. The "release" coil 141 instantly opens relay 135, progressively opening switches 140, 138 and 137, in that order, so that the welding current is never "on" when the carriage stops, or when the welding rollers are raised from the work.

If the "reverse" switch 124 or limit switch 165 is actuated, the same result is secured except that the limit switch 165 remains closed until after the carriage has moved away from the limit switch on its return trip. In view of this protracted closing of the limit switch it is necessary that the control be transferred to the opposite limit switch 176. With the parts in the position shown, except for the fact that limit switch 165, or reverse switch 124, has been closed, a circuit is closed by the reversing switch as follows; from lead 132, by wires 143, 144, coil 191 (raising the contact bars of relay 180), through wire 192, relay 181, contact bar 182, contact 189, wire 183, limit switch 165, or through wire 163, and reversing switch 124, to line 130. Energization of coil 191 of relay 180, raises cross-bar 193 and latches it in raised position, closing a circuit from lead 132, through wires 143, 144, contact 196, bar 193, contact 195, wire 186, through coil 184 of relay 181, raising cross-bar 182 out of contact with contact 189, to latched position in contact with contact 190, through wire 183, and switches 165 or 124, to line 130.

It will thus be apparent that the control has been transferred to the circuit of the "forward" switches, although nothing happens in that circuit until a switch is closed in that circuit. Of importance in this connection is the fact that the actuation of relay 180 has also raised cross-bar 194 and closed a circuit from lead 132, wires 143, 144, contact 211, through cross-bar 194, contact 198, wire 200, "release" coil 141, wires 201, 147, to line 130. The release coil successively and automatically opens all of the switches in the sequential relay and stops everything. The carriage stops in engagement with limit switch 165, holding it closed until the carriage moves in the reverse direction. The opening of switch 138 of relay 135, breaks the circuit in the coil of relay 153, closing a circuit from lead 132, through relay 153, cross-bar 166, contact 156, wire 160 through coil 161 of relay 158, raising the cross-bar 179 to latched position in engagement with contacts 119 and 129, through wires 162, 164, the reversing or limit switch to ground. Simultaneously a circuit has been established from lead 132, through wires 143, 139, contact 119, contact bar 179, contact 129, of relay 158, through wires 149 and 159, and the coil of relay 157, thus raising cross-bar 159 into engagement with reversing contacts 174 and 175, although the crane motor is not at that time energized.

It will be seen that at this time, with everything stopped, relays 180, 181 and 158 will be latched in their "up" positions, and relay 157 will be electrically held "up".

If now the cycle is started anew by pushing the start button or switch three distinct times the coil of relay 153 will be energized and the cross-bar 166 will be raised to close a circuit through the crane motor through relay 157.

The first operation of the sequential relay 135 closes the neutral switch 203 which completes the circuit; line 132, wire 143, coil 208 of relay 180, wire 210, contact 106, cross-bar 204, contact 105, wire 202, line 130. This releases the latch of relay 180 and opens the circuit to the releasing coil 141 of sequential relay 135 thus making it possible for the sequential operating coil 136 to perform its operations.

When the limit switch 176 or "forward" switch 126 is actuated in due course coil 191 will be actuated to close relay 180; this will actuate release coil 141 of relay 135, and when relay 135 has opened contact 138, relay 153 will drop out. The opening of relay 153 will make up the back contact 156 which will actuate the release coil 177 of relay 158 to drop its contact bar and the circuit through the coil of relay 157 will be opened and the relay will drop to reverse the connections to the carriage motor. When relay 180 closes the release coil 187 of relay 181 will be actuated dropping out relay 181. Relay 180 will be unlatched on the first operation of the sequential relay 135 which restores all relays to the forward operating condition. This is believed to be clear.

The operation of the apparatus, in résumé, starts with the parts shown in the diagrammatic position, it may be presumed, with all of the relays open and no circuit closed and with the carriage at the rear end of the table. The table 10 is positioned laterally to bring selected rods 30 in substantial alignment with the electrode rollers according to the pitch of corrugated sheet to be welded, and in accordance with the particular apertures 40 or 44 in the guide plate 15, as predetermined by the plate positioning, and the anchoring of pin 16 therein. At this juncture the previously corrugated sheet 32 is laid upon the grid with appropriate rods 30 seated within the respective corrugations. This is facilitated by the restrained floating characteristics of the rods 30, enabling such slight lateral shifting as will permit proper seating of a rod in a corrugation. This may be accomplished by dropping the weighted rollers upon the corrugated sheet, until seating is accomplished.

Then the flat sheet 39, of the desired material, illustratively hard stainless steel is superimposed on the corrugated sheet and has its free ends secured in the respective clamps in the stretching or tensioning devices at the ends of the table, and the jack, or other tensioning device, is actuated so as to subject the sheet to tension substantially in the plane of the peaks of the corrugation of the corrugated sheet. This removes the bumps, indentations and other irregularities normally present in the unrolled sheet of steel. The weighted rollers are then caused to rest upon the assembled sheets and to force them into intimate uniform contact over all of the contacting areas outlined by the rollers. It will be evident that at this point, and during the welding operation to follow, the flat sheet is exactly tangential to the corrugations of the lower sheet, and that the corrugations have a rod 30 in intimate contacting relation in the peak of the corrugation so that even though the flattened contact area of a roller electrode should by mischance not be exactly centered relative to the crest or peak of the corrugation beneath the flat sheet, the weld spot will still take place exactly on the peak of the corrugation.

The sequence of button pushing is initiated, and the welding carriage travels longitudinally of the table and the superposed work and simultaneously welds two rows of welds. Usually the rows are adjacent and the welding current travels from the secondary coil down through one weld roller, through the work and into the bed of rods, through the work and up the other weld roller, to the secondary coil. At the conclusion of a row or rows of welds the carriage is stopped, and the table and work are shifted laterally to register the welding rollers with the next pair of corrugation supporting rods and the travel is repeated in reversed direction. Obviously the rate of speed of the carriage and the rate of the welding timer are predetermined so that the resultant weld lines are composed of predeterminedly spaced or overlapping spots.

Among other advantages of the instant invention is the formation of flat work which is later to be bent, in such a manner that the bend is accomplished without undue stressing or flattening of the convex side of the bend. Assume the entering edge of an airplane wing, for instance, as shown at Fig. 8. It is desirable that the metal 220 comprising the outer skin of the entering edge be continuously curved which requires that the portions 221 between corrugation peaks 222 and 223, for instance, also be continuously curved on the proper curvature. If, however, the work is finished and welded on the instant device, as explained heretofore, the portions of metal between corrugation peaks is stretched and is held flat, owing to the curvature so that the entering edge comprises a series of flats between corrugations, in place of the continuous curved surface desired. The simple device for securing this result is shown in Fig. 7, in which the valleys or upwardly presented corrugations between rods 30 support elongated independent deforming rods 224 upon which the relatively uncorrugated sheet is superimposed and in which a shallow arcuate bump or swelling 225 is formed in the area 221 between adjacent corrugation peaks 222 and 223. Usually but one or two of the metal crowding rods are used at a time. The effect is to crowd extra metal (225) into the space between corrugation peaks, without causing the metal to flow, which is later pulled into the continuous curve shown in Fig. 8, when the bending is accomplished. After the sheets are welded by weld lines on each side of an independent rod 224, the latter is pulled out axially against the frictional resistance caused by its engagement with each sheet, thus leaving the "crowded" elongated portions 225 in the composite sheet.

The curvilinear grid alternatively proposed will secure similar ends, of itself, if the curve is that desired for the finished work.

Although two rollers in series through the work and the supporting grid are shown, it will be understood that a single roller could be resorted to, or a larger number could be used, as shown for instance, in Fig. 16. In this purely diagrammatic disclosure, the primary 310 of a welding transformer, is disposed in operative relation to the secondary coil 311. A series of welding rollers, illustratively 312, 313, working as one pair, and 314 and 315, working as another pair, are provided suitably for juxtaposed operative engagement with work sheet 39 and corrugated reinforcement 32. Roller 312 is connected to a terminal 316 of a switch 317 connected to one end of the secondary coil 311, while roller 313 is connected by lead 319 to a pole 318 of a switch 320, in turn connected to the other end of secondary coil 311 by wire 321. When the switch 320 is on pole 318, and the coupled switch 317 is on pole 316, the secondary or welding current is from the coil 311 through switch 317, roller 312, the work, through the supporting grid (not shown in Fig. 16) through the work, through roller 313 to the coil 311, through switch 320. Roller electrode 314 connects by lead 322 to a pole or switch terminal 329 of switch 317, and roller 315 connects by lead 323 to the pole 324 of the switch 320. When rollers 312 and 313 are in series in the welding circuit, obviously because of the switch dispositions, electrodes 314 and 315 carry no welding current. Reversal of switches 317 and 320 cuts out the first pair of roller electrodes, and places rollers 314 and 315 in series with the transformer secondary. To move switches 317 and 320 from pole to pole as desired a timed means, such as a motor driven crank 325 drives switches 317 and 320 through pitmans or connecting rods 326 and 327. The motor driven member 325 is synchronized with the timer motor 114 operatively associated with the transformer in any desired manner so as to reverse the polarity of the switches between timed impulses. Obviously the alternate use of the pairs of rollers with a common transformer, establishes slightly staggered welding spots in adjacent or contiguous rows of spot welds, but accomplishes twice the work in the same time and in the same travel of the carriage. Obviously this can be modified as desired so as to introduce more rollers, either single rollers, or pairs thereof.

It will be understood that the instant disclosure is purely illustrative and in many cases merely diagrammatic, and is obviously susceptible to many modifications. It will also be understood that all necessary auxiliary devices such as are common in the welding art may be provided with the instant invention. For instance it is contemplated that suitable means will be provided for spraying water upon the work adjacent to the welding rollers, and that this may be controlled by valve operated either manually or automatically.

We claim:

1. A welding apparatus comprising a table for supporting the work, a grid of rods mounted on the table and comprised of spaced parallel electrically interconnected rods, means enabling lateral adjustments of the table in a direction transverse to said grid, a welding roller the axis of which is substantially normal to a rod of the grid, the welding roller arranged to engage work on a rod, and means for securing longitudinal relative motion between said roller and a rod.

2. A welding apparatus comprising a traveling carriage, means supporting the carriage for horizontal movement, a welding roller mounted on the carriage, a table for supporting the work during the rolling movement of the electrode, means for holding the work in a predetermined position relative to the contact area of the rolling electrode during welding and said means comprising a rolling clamp arranged to hold parts of the work laterally spaced from the welding area of the work in a predetermined position to the welding area of the work to secure a predetermined contour to the finished welded work.

3. A welding apparatus comprising a table for supporting the work, said table comprising a plurality of spaced substantially parallel horizontal transversely curved rods, and a welding roller the axis of which is substantially normal to said rods, and means for securing longitudinal relative motion between said rods and said roller.

4. A welding apparatus comprising a traveling carriage, means for supporting the carriage for horizontal movement, means on the carriage for driving same on the supporting means, a welding roller on said carriage, means for moving said roller vertically, and weighted rollers extending transversely of and movable on said carriage and disposed on each side of the welding roller and of such length as to exert pressure on the work laterally appreciably spaced from the welding roller.

5. In welding apparatus, a traveling carriage, a primary guide frame on the carriage, an electrode roller operatively supported on the guide frame, means for moving the roller vertically relative to said frame, a secondary guide frame on the carriage, an electrode roller operatively supported on the secondary guide frame, means for moving the last mentioned roller vertically relatively to the secondary guide frame, and means for securing lateral relative movement of said rollers.

6. In welding apparatus, a fixed support, a table, a traveling carriage mounted on the support, means for moving the carriage at a predetermined but variable speed relative to the table, a welding timer for producing timed welding impulses, a welding roller electrode operatively electrically associated with the timer and with the carriage, the whole so constructed and arranged that a series of spot welds can be effected upon work mounted on the table with spaces between welds variable with and as a function of the carriage speed as the rolling electrode moves relative to work on said table.

7. In welding apparatus, a table comprising a plurality of substantially parallel cylindrical rods extending longitudinally of the table, and means for supporting same against yielding under welding pressures.

8. In welding apparatus, a table comprising a plurality of substantially parallel cylindrical rods extending longitudinally of the table, and means for supporting same against yielding under welding pressures, said supporting means including a rigid grid of substantially flat inflexible strips underlying and reinforcing the respectve rods.

9. In welding apparatus, a table comprising a plurality of substantially parallel cylindrical rods extending longitudinally of the table, and means for supporting same against yielding under welding pressures, said supporting means including a rigid grid of substantially flat inflexible strips underlying and reinforcing the respective rods, and means holding the rods and strips together against vertical relative movement while permitting slight lateral relative adjustment.

10. In welding apparatus, a support, a carriage mounted on the support, a table relative to which the carriage has longitudinal travel, said table having a surface comprised of spaced parallel cylindrical rods upon which a corrugated sheet can be disposed with rods in corrugations and with a flat sheet on the corrugated sheet, a pair of welding rollers substantially vertically adjustably mounted on the carriage and operatively aligned with respective rods, means for passing a welding current through work engaged between a roller and a rod.

11. In welding apparatus, a support, a carriage mounted on the support, a table relative to which the carriage has longitudinal travel, said table having a surface comprised of spaced parallel cylindrical rods upon which a corrugated sheet can be disposed with rods in corrugations and with a flat sheet on the corrugated sheet, a pair of welding rollers substantially vertically adjustably mounted on the carriage and operatively aligned with respective rods, means for passing a welding current through work engaged between a roller and a rod, arms on the carriage, a weighted roller extending transversely between the arms of appreciably greater length than the respective electrode rollers, and means for moving the arms to dispose the roller operatively on the work on the rods on each side of the line of welds from a roller electrode.

12. In welding apparatus, a support, a carriage mounted on the support, a table relative to which the carriage has longitudinal travel, said table having a surface comprised of spaced parallel cylindrical rods upon which a corrugated sheet can be disposed with rods in corrugations and with a flat sheet on the corrugated sheet, a pair of welding rollers substantially vertically adjustably mounted on the carriage and operatively aligned with respective rods, means for passing a welding current through work engaged between a roller and a rod, arms on the carriage, a weighted roller extending transversely between the arms of appreciably greater length than the respective electrode rollers, and means for moving the arms to dispose the roller operatively on the work on the rods on each side of the line of welds from a roller electrode, and a second weighted vertically movable roller on the other side of said roller electrodes from the first mentioned roller.

13. In welding apparatus, a support, a carriage mounted on the support, a table relative to which the carriage has longitudinal travel, said table having a plurality of removable and replaceable surfaces each comprised of spaced parallel cylindrical rods upon which a corrugated sheet can be disposed with rods in corrugations and with a flat sheet on the corrugated sheet, a pair of welding rollers substantially vertically adjustably mounted on the carriage and operatively aligned with respective rods of a given surface, means for passing a welding current through work engaged between a roller and a rod, and means for varying the lateral spacing between the electrode rollers to accord with a change in effective spacing of said rods.

14. In welding apparatus, a support, a carriage mounted on the support, a table relative to which the carriage has longitudinal travel, said table having a surface comprised of spaced parallel cylindrical rods upon which a corrugated sheet can be disposed with rods in corrugations and with a flat sheet on the corrugated sheet, a pair of welding rollers substantially vertically adjustably mounted on the carriage and operatively aligned with respective rods, means for passing a welding current through work engaged between a roller and a rod, and means operatively associated with the table for subjecting such flat sheet to endwise tension in substantial parallelism with said rods and maintaining the tension during welding movement of the carriage.

15. A welding apparatus comprising a table, a grid of electrically interconnected parallel rods removably mounted on the table, a traveling carriage, a pair of substantially parallel welding rollers mounted on the carriage, means for securing lateral relative adjustments of the rollers to accord with the clearance between the rods of the grid, and means for moving the carriage and rollers longitudinally of the grid and table.

16. A welding apparatus comprising a table of appreciable length, means supporting the table for lateral shifting movement, a welding roller, means for securing relative longitudinal movement of the roller and the table, and means for synchronizing the shifting movement of opposite ends of the table to maintain a predetermined alignment with the welding roller relative movement.

17. A welding apparatus comprising a table for supporting the work comprising a plurality of spaced substantially parallel horizontal rods electrically interconnected, a pair of welding rollers having each an axis substantially normal to a rod arranged for alignment with selected rods of a pair in electrical interconnection, said rods presenting toward the rollers transversely curved surfaces and means for passing a welding current through one welding roller through the work, through a rod through the electrical connection between rods through the other rod of said pair and through the other of said pair of welding rollers after passing again through the work.

18. In welding apparatus, a table comprising a plurality of substantially parallel substantially cylindrical conductive electrically interconnected rods, supporting means for the rods comprising a rigid grid of substantially flat surfaced strips underlying and reinforcing the respective rods.

19. In welding apparatus, a table, a pair of rolling electrodes, means securing longitudinal relative movement of the roller and table, means in front and behind the rollers relatively traveling with the rollers to hold the parts of the work laterally remote from the weld in a predetermined position relative to the part being welded to prevent warping and distortion.

20. In welding apparatus, a table comprising a plurality of substantially parallel substantially cylindrical rods extending longitudinally of the table, and means for supporting same against yielding under welding pressures including a rigid grid of substantially flat surfaced relatively inflexible strips underlying and reinforcing the respective rods, and means holding the rods and strips together against vertical relative movement while permitting slight lateral relative adjustment, said rods being continuously electrically interconnected.

21. In welding apparatus, a support, a carriage mounted on the support, a table relative to which the carriage has longitudinal travel, said table having a surface comprised of spaced parallel substantially cylindrical rods upon which a corrugated sheet can be disposed with rods in corrugations and with a flat sheet on the corrugated sheet, a plurality of welding rollers substantially vertically adjustable on the carriage and operatively aligned with selected rods, said rods being electrically interconnected, and means for passing a welding current through certain of the welding rollers the work and the grid of rods.

22. In welding apparatus, a support, a carriage mounted on the support, a table relative to which the carriage has longitudinal travel, said table having a surface comprised of spaced parallel cylindrical rods upon which a corrugated sheet can be disposed with rods in corrugations and with an uncorrugated sheet on the corrugated sheet, a plurality of welding rollers adjustably mounted on the carriage and operatively aligned with selected rods, means for passing a welding current through work engaged between a roller and a rod, a rolling clamp comprising a weighted roller resting upon the work both before and behind the adjacent points of the roller and rod through which the current passes and extending laterally of such point so as to hold the corrugated and uncorrugated sheets in such juxtaposition as to cause the finished work to conform to a predetermined unwarped contour.

23. In welding apparatus, a table, a removable grid forming the surface of the table, said grid comprised of a plurality of parallel substantially rigid substantially flat surfaced strips, means connecting the strips electrically and physically in spaced relation, a plurality of substantially cylindrical rods juxtaposed upon the flat surface of the respective strips, each rod having a peripheral groove, clamp means engaging the respective strips and rods having a portion received in said groove to form a substantial cylindrical continuation of the surface of the said rod, said clamp means so arranged as to permit slight lateral shifting of the rods without breaking the electrical engagement with the strip, and said strips and rods being of electrically conductive material.

24. In welding apparatus, a table, a rolling electrode, means for securing longitudinal relative movement between the table and rolling electrode, a tensioning device for subjecting the work between the table and electrode to longitudinal tension during welding to obviate unevenness in the finished work.

25. In welding apparatus, a table having a work supporting surface comprised of spaced rods to receive corrugated material, means on the table for subjecting uncorrugated material to tension longitudinally of the table while the uncorrugated material is juxtaposed upon the corrugated material, means for welding the juxtaposed materials, and a rolling clamp arranged to hold the juxtaposed corrugated and uncorrugated sheets in a predetermined position at points remote from the weld point to insure that the finished work conforms to a predetermined contour free from wrinkles as well as from warping.

26. In welding apparatus, a tensioning device for subjecting work to be welded to predetermined endwise tension during welding, with indicating means operatively associated therewith to predetermine the tension.

27. In welding apparatus, a support, a table mounted on said support and arranged for lateral movement thereon, a grid of rods removably mounted on the table and comprising the supporting surface of said table, a plurality of electrode rollers, means supporting the electrode rollers in alignment with rods of the grid, and means for varying the lateral spacing of the rollers to accord with variations in spacing of the rods of the grid, and means for securing relative rolling movement of the roller electrodes and the grid of rods longitudinally of the rods.

28. A method of welding sheets together which comprises supporting the sheets on a table, subjecting the superposed sheets to the compressing action of a rolling clamp at points spaced fore and aft and laterally of the instantaneous weld point to maintain a predetermined position of the points remote from the welding during welding, and then in welding the sheets together in a position predetermined by the rolling clamp.

29. A process of welding a relatively flat sheet to the peaks of round corrugations in a relatively corrugated sheet, which comprises associating a rod electrode having an upper substantially cylindrical surface longitudinally with the undersurface of the peak of a round corrugation, of superimposing the relatively flat sheet upon said peak, then of rolling a flat-rimmed electrode roller along the relatively flat sheet in substantial alignment with said rod, and in passing a plurality of welding current impulses between the roller and rod through the peak of the corrugation and the superimposed sheet.

30. A process of welding round corrugated sheets to flat sheets which comprises applying corrugated sheets to a grid of substantially cylindrical rods fitting in the respective corrugations, and in applying a flattened roller electrode to the superimposed flat sheet in alignment with a corrugation to insure that the welding is on the peaks of the corrugations.

31. A method of forming a continuously curved reinforced section which includes positioning a rod between adjacent corrugations of a corrugated reinforcing sheet so that its peak extends beyond a plane common to the peaks of said adjacent corrugations, superimposing a relatively flat sheet upon the corrugated sheet and rod, spot welding the relatively flat sheet to the peaks of the corrugations adjacent to the rod to bend the sheet about the rod and to impart an initial curvature to the uncorrugated sheet, removing the rod, and bending the combined flat and corrugated sheets.

32. A method of welding corrugated sheets to relatively uncorrugated sheets which comprises imposing a corrugated sheet upon a grid of rods with rods disposed in the respective corrugations, in superimposing upon the corrugated sheet a relatively uncorrugated sheet, pressing the uncorrugated sheet firmly upon the corrugated sheet by a rolling clamp on each side of the instantaneous weld point, and in welding the sheets together between the rolling clamps.

33. A method of welding relatively corrugated and uncorrugated sheets together in a predetermined contour which comprises mounting the corrugated sheet on a table with rods in the respective corrugations, superimposing upon the corrugated sheet a relatively uncorrugated sheet, subjecting the relatively uncorrugated sheet to tension, securing relative longitudinal movement of the composite sheet and a roller electrode, subjecting portions of the composite sheet remote from the instantaneous weld point to rolling pressure to maintain a fixed position of the adjacent sheets relative to the portions of the adjacent sheets at the weld point, and then passing a welding current through the work at the weld point.

34. A welding apparatus for corrugated work comprising a table for supporting the work, said table comprising a plurality of longitudinally extending spaced substantially parallel horizontal rods the upper half substantially of each of which rods is substantially a semi-cylindrical bearing surface, with an air gap laterally between adjacent upper half portions into which gap upwardly presenting corrugations extend downwardly from a corrugated sheet while downwardly presenting corrugations nest upon rods on each side of a respective gap, a welding roller having a flat rim the axis of which is substantially normal to said rods, said roller being disposed in substantial alignment with a selected rod, and means for securing relative longitudinal motion between the rod and said roller with the flat rim of the roller at its contacting point being substantially tangential to the central bearing surface thereof and to a corrugation nested thereon.

35. A welding apparatus comprising a table for supporting the work, said table having a rigid rod supporting portion the upper surface of which lies in a common horizontal plane, a plurality of substantially cylindrical rods disposed longitudinally on said supporting portion in parallelism and in laterally spaced relation, a welding roller having a flattened rim disposed substantially symmetrically of a rod with the rim substantially tangential to the upper surface of said rod at its contacting point, and means for securing relative longitudinal movement of the roller and rod.

36. In welding apparatus, a table comprising a plurality of substantially parallel substantially cylindrical rods extending longitudinally of the table, means for supporting same against yielding under welding pressures comprising a rigid support having an upper surface in a common plane, with the rods mounted on the common plane, means anchoring the rods to the supporting means while permitting slight lateral shifting thereof on said common plane to accord with inequalities and the like in the work.

37. In welding apparatus, a table, a rolling electrode, means securing longitudinal relative movement of the rolling electrode and table, means in front of and behind the roller relatively traveling with the electrode to hold the parts of the work laterally and longitudinally remote from the weld point in a predetermined position relative to the part being welded to prevent warping and distortion.

38. In welding apparatus, a table, a roller electrode, means securing longitudinal relative movement of the roller and table, a rolling clamp engaging the work laterally and longitudinally spaced from the weld point to hold the parts of the work remote from the weld in a predetermined position relative to the part being welded to obviate warping, and means exerting tension on the work during welding.

39. In welding apparatus, a table, means anchoring the work to the table and subjecting it to longitudinal tension, a roller electrode, means securing longitudinal relative movement of the work on the table and the roller, an elongated weighted roller disposed longitudinally respectively on each side of the electrode and bearing upon the work under tension to clamp the work to the table at points laterally and longitudinally spaced from the welding point so as to prevent warping and distortion.

40. In welding apparatus, a table, means mounted toward one end of the table for anchoring an end of the work, means mounted toward the other end of the table for engaging another end of the work, said second-mentioned means including a tensioning device whereby work engaged by both means may be subjected to tension longitudinally of the table, an electrode operatively disposed relative to the work on said table effective to weld the work during the maintenance of tension thereon.

CARL DE GANAHL.
THOMAS B. LAVELLE.